United States Patent
Nishihashi et al.

(10) Patent No.: US 9,753,563 B2
(45) Date of Patent: Sep. 5, 2017

(54) MANIPULATION APPARATUS AND MANIPULATION TEACHING METHOD FOR MANIPULATION APPARATUS

(71) Applicant: DENSO CORPORATION, Kariya, Aichi-pref. (JP)

(72) Inventors: Shigeaki Nishihashi, Nagoya (JP); Satomi Hosokawa, Takahama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 128 days.

(21) Appl. No.: 14/649,001

(22) PCT Filed: Nov. 27, 2013

(86) PCT No.: PCT/JP2013/006957
§ 371 (c)(1),
(2) Date: Jun. 2, 2015

(87) PCT Pub. No.: WO2014/087604
PCT Pub. Date: Jun. 12, 2014

(65) Prior Publication Data
US 2015/0346851 A1 Dec. 3, 2015

(30) Foreign Application Priority Data
Dec. 3, 2012 (JP) ................. 2012-264481

(51) Int. Cl.
G06F 3/041 (2006.01)
G06F 3/0488 (2013.01)
G06F 3/0484 (2013.01)

(52) U.S. Cl.
CPC ............ *G06F 3/041* (2013.01); *G06F 3/0488* (2013.01); *G06F 3/04842* (2013.01); *G06F 2203/04809* (2013.01)

(58) Field of Classification Search
CPC .............. G01C 21/3664; G01C 21/367; G06F 2203/04108; G06F 3/04812; G06F 3/04815; G06F 3/04883
See application file for complete search history.

(56) References Cited

U.S. PATENT DOCUMENTS 7,129,933 B1* 10/2006 Nishikawa .......... G06F 3/03547
178/18.01
2010/0309162 A1* 12/2010 Nakanishi ............... G06F 3/044
345/174

(Continued)

FOREIGN PATENT DOCUMENTS

JP        H11338629 A    12/1999
JP        2000194502 A    7/2000

(Continued)

OTHER PUBLICATIONS

International Search Report and Written Opinion (in Japanese with English Translation) for PCT/JP2013/006957, mailed Mar. 4, 2014; ISA/JP.

(Continued)

*Primary Examiner* — Benjamin C Lee
*Assistant Examiner* — Xuemei Zheng
(74) *Attorney, Agent, or Firm* — Harness, Dickey & Pierce, P.L.C.

(57) ABSTRACT

A manipulation apparatus includes a detection circuit and a manipulation control circuit to acquire a manipulation body distance from a manipulation surface to a finger of a manipulator. The manipulation in a first manipulation space having the manipulation body distance smaller than a first threshold distance is associated with movement of a pointer and distinguished from the manipulation in a second manipulation space having the manipulation body distance equal to or greater than the first threshold distance. A tactile pattern is formed to the manipulation surface, while a visual (Continued)

pattern is displayed around the point, the visual pattern having the shape corresponding to the tactile pattern. The combination of tactility and visuality teaches the manipulator the pointer being movable by contact manipulation onto the manipulation surface.

18 Claims, 13 Drawing Sheets

(56) References Cited

U.S. PATENT DOCUMENTS

| 2011/0128164 A1* | 6/2011 | Kang | G01C 21/3664 |
| | | | 340/995.16 |
| 2015/0205943 A1 | 7/2015 | Takenaka et al. | |

FOREIGN PATENT DOCUMENTS

| JP | 2010102508 A | 5/2010 |
| JP | 2010128788 A | 6/2010 |
| JP | 2011118857 A | 6/2011 |
| JP | 2012190185 A | 10/2012 |

OTHER PUBLICATIONS

Office Action in Corresponding JP Application No. 2012-264481 mailed Feb. 24, 2015.

\* cited by examiner

FIG. 10
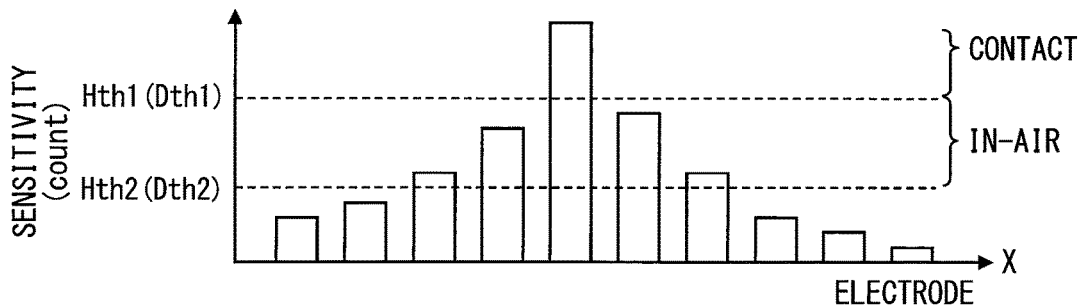
FIG. 11
| | THRESHOLD (count) |
|---|---|
| Hth1 | 200 |
| Hth2 | 100 |
FIG. 12
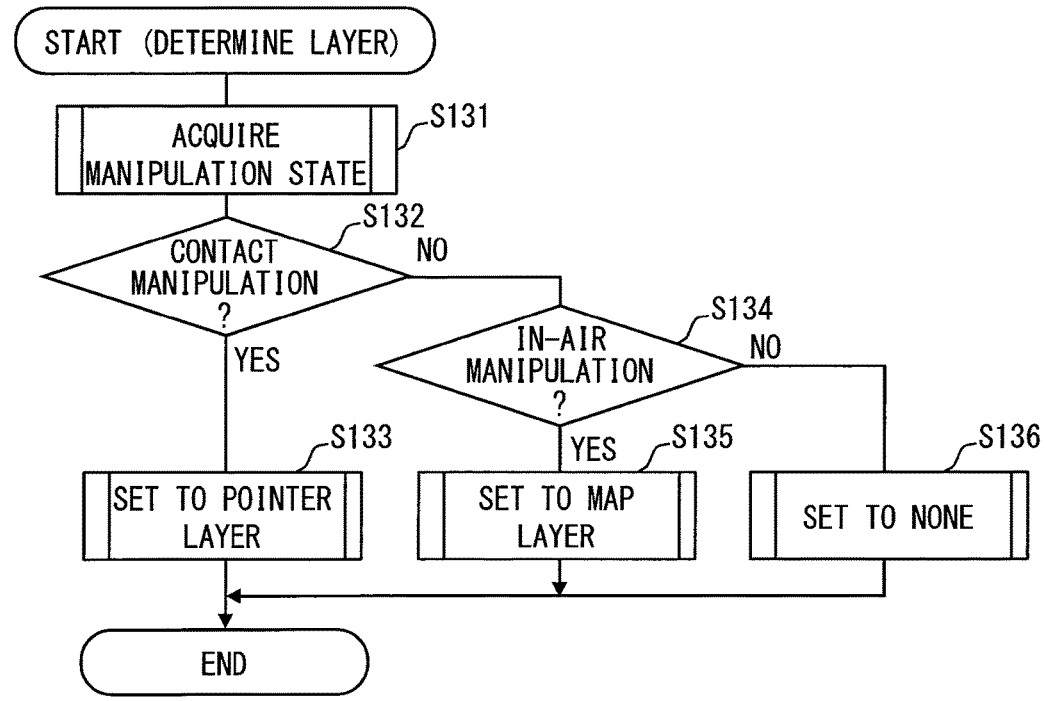

MANIPULATION APPARATUS AND MANIPULATION TEACHING METHOD FOR MANIPULATION APPARATUS

CROSS REFERENCE TO RELATED APPLICATIONS

This application is a U.S. National Phase Application under 35 U.S.C. 371 of International Application No. PCT/JP2013/006957 filed on Nov. 27, 2013 and published in Japanese as WO 2014/087604 A1 on Jun. 12, 2014. This disclosure is based on and claims the benefit of priority from Japanese Patent Application No. 2012-264481 filed on Dec. 3, 2012. The entire disclosures of all of the above applications are incorporated herein by reference.

TECHNICAL FIELD

The present disclosure relates to a manipulation apparatus to manipulate an image portion displayed on a display screen according to an input to a manipulation surface.

BACKGROUND ART

For example, Patent Literature 1 discloses a technique to move image portions, such as a pointer for navigation or a radio main window, displayed on a display screen in association with manipulation to a remote touchpad portion. A user interface apparatus disclosed in Patent Literature 1 includes (i) a remote touchpad portion that detects moving manipulation of a finger of a manipulator and (ii) a control portion that associates the finger manipulation detected by the remote touchpad portion with movement of a map or a pointer.

The control portion further acquires a distance from the remote touchpad portion to the finger. When the distance to the finger acquired by the control portion is smaller than a predefined height, for example, three centimeters (cm), the control portion associates the finger manipulation detected by the remote touchpad portion with movement of the pointer on the display screen. In contrast, when the acquired distance to the finger is a predefined height, for example, in the range of 5 cm to 7 cm, the control portion associates a finger manipulation detected by the remote touchpad portion with a switch from the radio main window to a manipulation standby window.

PRIOR ART LITERATURES

Patent Literature

Patent Literature 1: JP 2011-118857 A

SUMMARY OF INVENTION

The inventors of the present disclosure have repeatedly analyzed the manipulation apparatus of Patent Literature 1 and found the following point needing improvement. That is, each manipulation is performed in each of several spaces defined in dependence on a distance to the finger; this does not easily teach a manipulator an image portion targeted for each manipulation. Only after the manipulator actually performs a manipulation in a space facing the remote touchpad portion, the manipulator may identify the image portion targeted for the manipulation.

An object of the present disclosure is to provide a technique permitting a manipulator to easily identify an image portion targeted for manipulation in a space facing a manipulation surface.

To achieve the above object, according to an example of the present disclosure, a manipulation apparatus is provided as follows. The manipulation apparatus manipulates an image portion displayed on a display screen according to an input by a manipulation body to a manipulation surface. The manipulation apparatus includes a detection section, an acquisition section, an association section, and a display control section. The detection section detects a movement of the manipulation body. The acquisition section acquires a manipulation body distance that is from the manipulation surface to the manipulation body. The association section distinguishes between (i) a first movement of the manipulation body detected in a first manipulation space providing the manipulation body distance being smaller than a predetermined threshold distance and a second movement of the manipulation body detected in a second manipulation space providing the manipulation body distance being greater than the threshold distance, and associates the first movement in the first manipulation space and the second movement in the second manipulation space, respectively, with a first image portion and a second image portion that are displayed on the display screen, the second image portion being different from the first image portion. The display control section changes a display form of either the first image portion associated with the movement or the second image portion associated with the movement, in response to the movement of the manipulation body. Herein, the manipulation surface is provided to form a tactile pattern with at least one of recesses and projections; and the display control section displays a visual pattern corresponding to a shape of the tactile pattern, at least, on or around the first image portion on the display screen.

According to another example of the present disclosure, a manipulation teaching method is provided as follows. The manipulation teaching method teaches a manipulation to a manipulation apparatus that manipulates an image portion displayed on a display screen according to an input by a manipulation body to a manipulation surface. The manipulation teaching method includes a detecting, an acquiring, and an associating, and a display controlling. The detecting detects a movement of the manipulation body. The acquiring acquires a manipulation body distance (d) that is from the manipulation surface to the manipulation body. The associating distinguishes between (i) a first movement of the manipulation body detected in a first manipulation space providing the manipulation body distance being smaller than a predetermined threshold distance and (ii) a second movement of the manipulation body detected in a second manipulation space providing the manipulation body distance being greater than the threshold distance, and relates the first movement in the first manipulation space and the second movement in the second manipulation space, respectively, with a first image portion and a second image portion (64, 264) that are displayed on the display screen, the second image portion being different from the first image portion. The display controlling changes a display form of either the first image portion or the second image portion in response to the movement of the manipulation body. Herein, in the display controlling, a visual pattern is displayed, at least, on or around the first image portion on the display screen, the visual pattern corresponding to a shape of a tactile pattern that is formed on the manipulation surface with at least one of recesses and projections.

According to the examples of the present disclosure, a manipulator who performs an input to a manipulation surface by using a manipulation body can sense, through tactility, a tactile pattern having, at least, either recesses or projections on the manipulation surface. Additionally, a visual pattern corresponding to the shape of the tactile pattern is displayed at least on a first image portion or around the first image portion. Such combination of tactility and visuality teaches the manipulator to relate the tactile pattern with the visual pattern sensed through sight so as to easily identify the first image portion targeted for manipulation in a first manipulation space from the plurality of image portions displayed on the display screen.

BRIEF DESCRIPTION OF DRAWINGS

The above and other objects, features and advantages of the present disclosure will become more apparent from the following detailed description made with reference to the accompanying drawings. In the drawings:

FIG. 10 is a diagram for explaining relationship between sensitivity values detected by a touch sensor and manipulation states determined by the manipulation control circuit in the remote manipulation apparatus of the first embodiment;

FIG. 11 is a listing diagram illustrating each sensibility threshold stored in the manipulation control circuit of the first embodiment;

FIG. 12 is a flowchart illustrating a manipulation layer determination performed by the manipulation control circuit of the first embodiment;

EMBODIMENTS FOR CARRYING OUT INVENTION

Hereafter, embodiments of the present disclosure are described based on the figures. Since corresponding components in respective embodiments are given the same reference signs, explanation may not be repeated. When only a certain part of a configuration in each embodiment is explained, the other part may be applied a configuration of another embodiment already explained. Not only an expressed combination of configurations in explanation of each embodiment but also a non-expressed sub-combination of configurations of embodiments are possible as long as there is no difficulty in the combinations. A non-expressed combination of configurations described in embodiments and modifications is also disclosed in the following explanation.

First Embodiment

Figure 1:
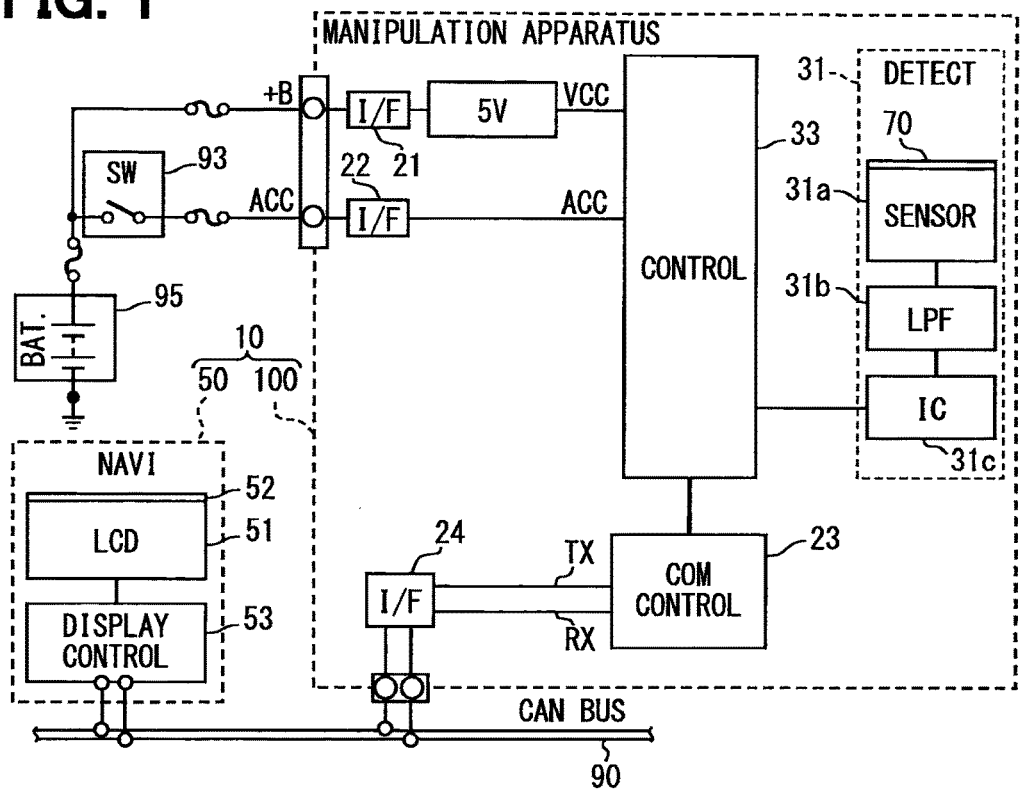
FIG. 1 is a diagram for explaining a configuration of a display system including a remote manipulation apparatus of a first embodiment of the present disclosure.
Figure 2:
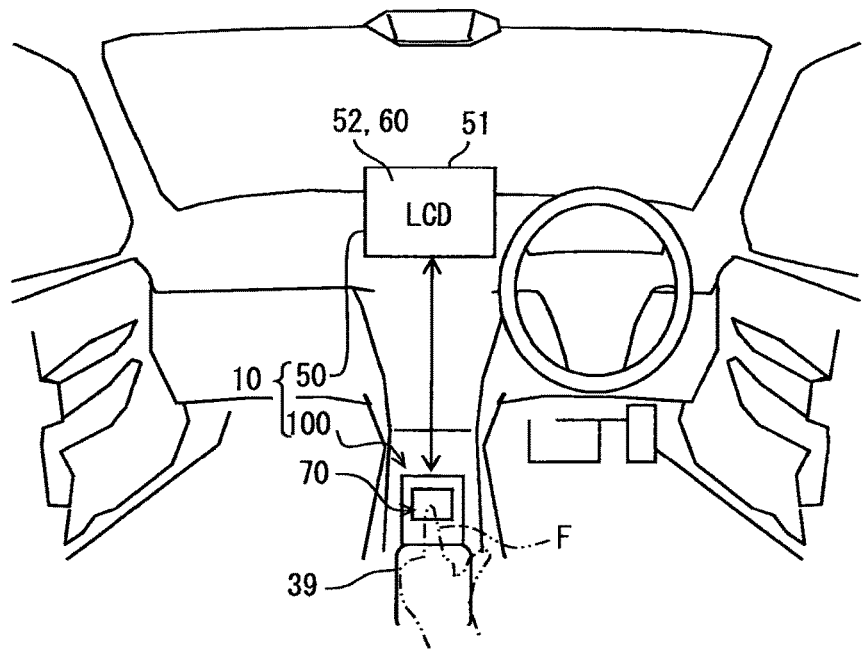
FIG. 2 is a diagram for explaining an arrangement of a display screen and a manipulation surface in a cabin of a vehicle.
Figure 3:
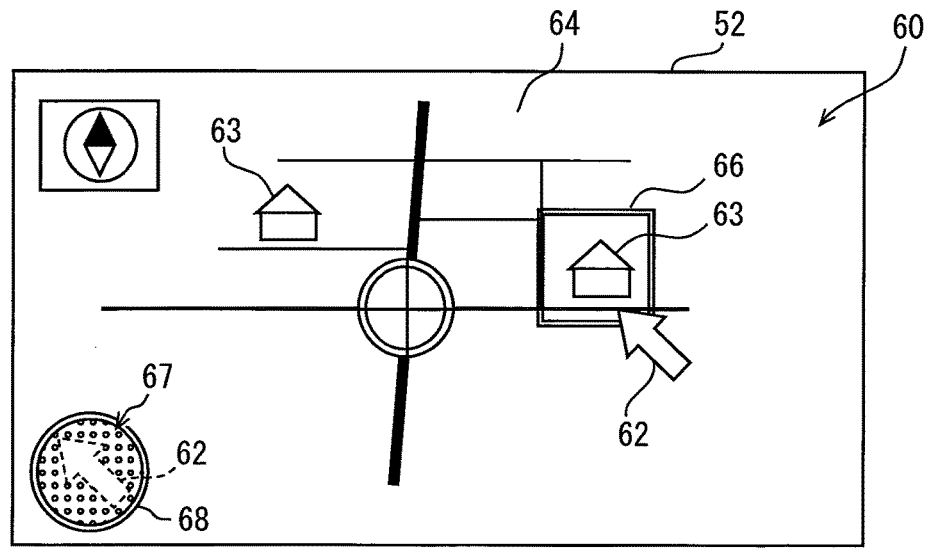
FIG. 3 is a diagram for explaining one example of a display image displayed on a display screen.

A remote manipulation apparatus 100 of a first embodiment of the present disclosure is mounted to a vehicle, and cooperates with a navigation apparatus 50 to form a display system 10, as shown in FIG. 1. As shown in FIG. 2, the remote manipulation apparatus 100 is installed adjacent to a palm rest 39 on a center console of the vehicle, and includes a manipulation surface 70 exposed to be accessible by a manipulator. The manipulation by a forefinger (hereinafter called just a "finger") F of the manipulator is input to the manipulation surface 70. The navigation apparatus 50 is installed in an instrument panel of the vehicle such that a display screen 52 is exposed to be visible from the manipulator and is directed toward the driver's seat. Various display images 60 are displayed on the display screen 52. The manipulator may also be also called an operator. Manipulating may be also referred to as operating or inputting. The display image 60 shown in FIG. 3 is one of display images displayed on the display screen 52, and is a navigation image that shows routes to a destination set by the manipulator. The display images 60 include a plurality of icons 63 associated with predetermined functions, a pointer 62 to select the icons 63, and a map 64 that shows forms of routes around the vehicle. Additionally, the display images 60 include a focus 66 that emphasizes the icon 63 superimposed with the pointer 62. The location to display the pointer 62 on the display screen 52 corresponds to the location where the finger F contacts the manipulation surface 70 shown in FIG. 2.

Figure 4:
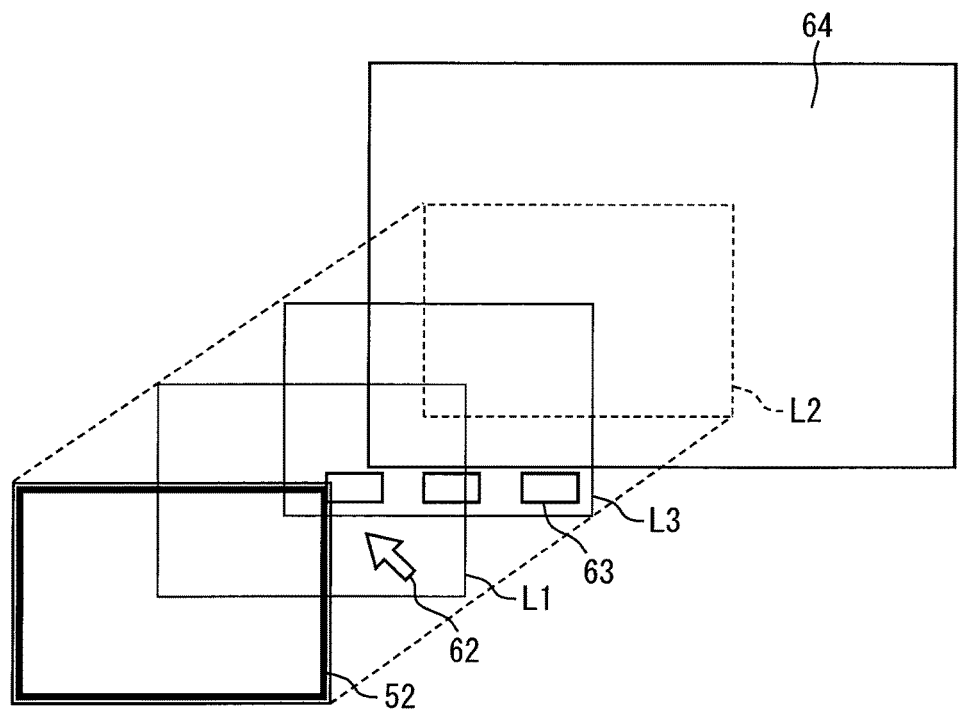
FIG. 4 is a diagram for explaining a display image formed of superimposition of rendering layers.

As shown in FIG. 4, the display images 60 are generated when the navigation apparatus 50 (see FIG. 1) superimposes a plurality of rendering layers with each other. Specifically, the display images 60 are generated by superimposing a map layer L2 to render a map 64, an object layer L3 to render the icons 63, and a pointer layer L1 to render the pointer 62. Each layer L1 to L3 is defined to be sized to the display screen 52.

Next, configurations of the remote manipulation apparatus 100 and navigation apparatus 50 shown in FIG. 1 are explained in detail.

The remote manipulation apparatus 100 is connected to a Controller Area Network (CAN) bus 90 and an external battery 95. The CAN bus 90 is a transmission path used for data transmission between each vehicle-mounted apparatus in an in-vehicle communication network that connects a plurality of vehicle-mounted apparatuses to each other. The remote manipulation apparatus 100 is capable of communicating with the navigation apparatus 50 that is remote from the apparatus by CAN communication via the CAN bus 90.

The remote manipulating apparatus 100 includes power interfaces 21 and 22, a communication control circuit 23, a communication interface 24, a detection circuit 31, and a manipulation control circuit 33. The power interfaces 21 and 22 stabilize electric power supplied from the battery 95 to supply the power to the manipulation control circuit 33. Power is always supplied to the power interface 21 from the battery 95. When a switch 93 becomes electrically conductive upon turn-on of an accessory (ACC) power of the vehicle, power is supplied from the battery 95 to the power interface 22.

The communication control circuit 23 and communication interface 24 output information processed by the manipulation control circuit 33 to the CAN bus 90, and acquire information outputted from other in-vehicle apparatuses to the CAN bus 90. The communication control circuit 23 and communication interface 24 are connected to each other by a signal line TX for transmission and a signal line RX for reception.

The present application uses "information" as not only an uncountable noun but also a countable noun.

As shown in FIGS. 1 and 2, the detection circuit 31 includes a touch sensor 31a, a low-pass filter 31b, and an electrostatic detection IC 31c. The touch sensor 31a is formed in a rectangular shape along the manipulation surface 70, and stores charge between itself and the finger F. The touch sensor 31a is formed by arranging (i) electrodes extending in the x-axis direction and (ii) electrodes extending in the y-axis direction, in a lattice form in FIG. 5. The low-pass filter 31b of FIG. 1 includes a passive resistor, a coil, and a capacitor. The low pass filter 31b inhibits high frequency noise components generated in the touch sensor 31a from being inputted into the electrostatic detection IC 31c. The electrostatic detection IC 31c is connected to the touch sensor 31a and manipulation control circuit 33. Charge is stored between the finger F and touch sensor 31a that are adjacent to each other as shown in FIG. 6. The electrostatic detection IC 31c of FIG. 1 acquires a sensitivity value (see FIG. 10) that varies in response to a capacitance between the finger F (see FIG. 6) and each electrode, and outputs the value to the manipulation control circuit 33.

The manipulation control circuit 33 includes a processor that performs various calculations, a RAM that functions as a workspace, and a flash memory that stores a program for calculations. Additionally, the manipulation control circuit 33 is connected to the power interfaces 21 and 22, communication control circuit 23, and detection circuit 31.

The manipulation control circuit 33 acquires a sensitivity value outputted from the detection circuit 31 by executing a predetermined program. The manipulation control circuit 33 detects an x-coordinate and y-coordinate that show a relative location of the finger F to the manipulation surface 70 (see FIG. 6), and a z-coordinate equivalent to a distance (hereinafter "manipulation body distance d" (see A of FIG. 7)) from the manipulation surface 70 to the finger F by calculations based on the sensitivity value. Thus, the manipulation control circuit 33 outputs the x-coordinate and y-coordinate that show the relative location of the finger F to the CAN bus 90 through the communication control circuit 23 and communication interface 24.

The navigation apparatus 50 shown in FIGS. 1 and 2 is connected to the CAN bus 90 to communicate with the remote manipulation apparatus 100. The navigation apparatus 50 includes a display control circuit 53 and a liquid crystal display 51.

The display control circuit 53 includes a processor that performs various calculations, a RAM that functions as a workspace for the calculations, a graphic processor that renders images, and a graphic RAM that functions as a workspace for rendering images. Additionally, the display control circuit 53 includes a flash memory that stores data used for calculations and rendering, a communication interface connected to the CAN bus 90, and an image output interface that outputs rendered image data to the liquid crystal display 51. The display control circuit 53 renders the display images 60 displayed on the display screen 52 on the basis of the information acquired from the CAN bus 90. The display control circuit 53 successively outputs rendered image data of the display images 60 to the liquid crystal display 51 through the image output interface.

The liquid crystal display 51 is a dot matrix display to realize color display by controlling a plurality of pixels arranged on the display screen 52. The liquid crystal display 51 displays images by continuously forming image data successively acquired from the display control circuit 53 on the display screen 52.

Manipulation modes are switched in response to the manipulation body distance d of the finger F that inputs moving manipulation in the remote manipulation apparatus 100 explained above. This changes the image portion, which is associated with the moving manipulation of the finger F, among the display images 60 shown in FIG. 7. The following will explain manipulation modes (1) to (3) predefined in the remote manipulation apparatus 100 in detail.

(1) Contact Manipulation Mode

Figure 7:
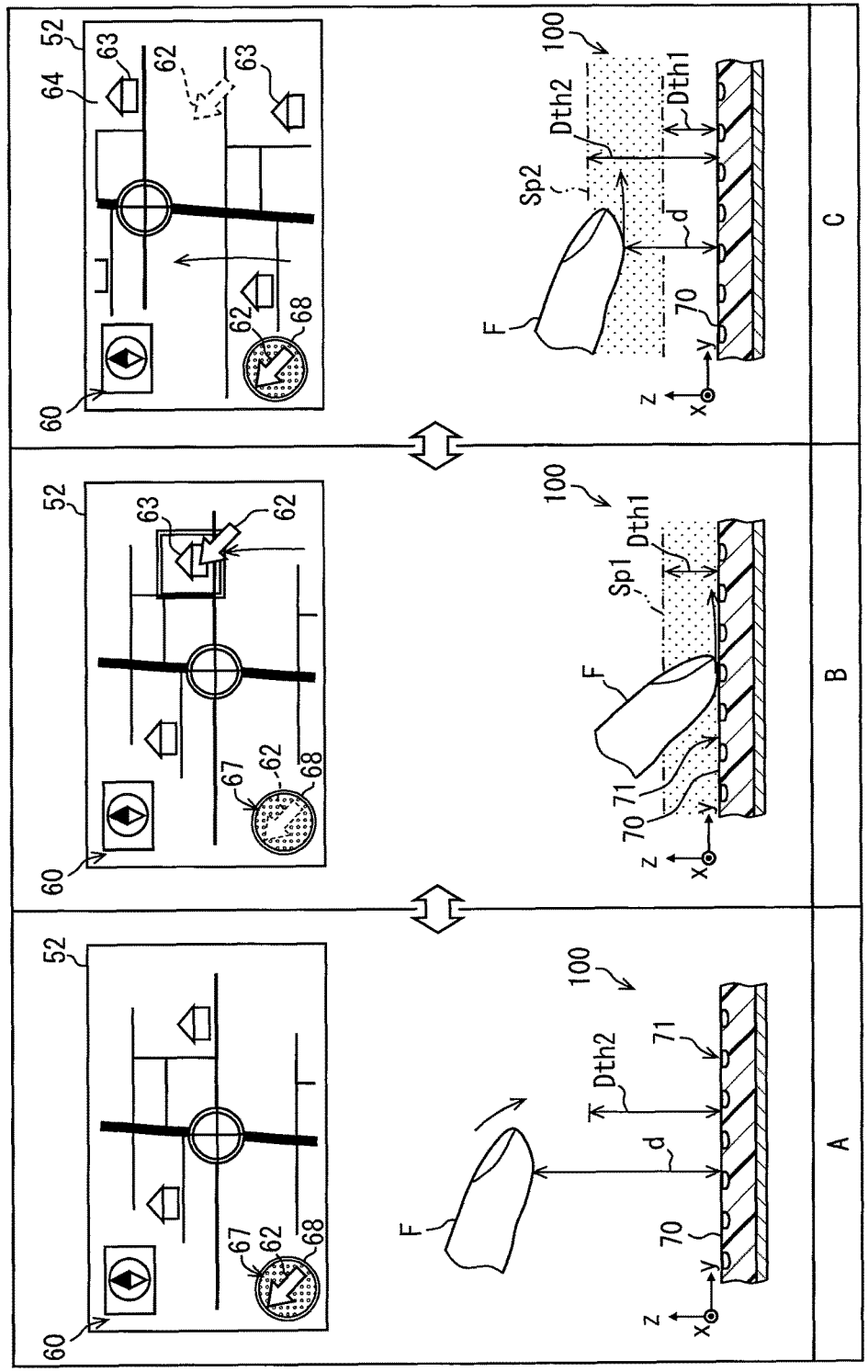
FIG. 7 is a diagram for explaining image portions targeted for manipulation changing depending on a manipulation body distance in the remote manipulation apparatus of the first embodiment.

In the contact manipulation mode, as shown in B of FIG. 7, the moving manipulation by the finger F is associated with a pointer control to move the display location of the pointer 62 displayed on the display screen 52. In such a contact manipulation mode, the finger F is located in a first manipulation space Sp1. The first manipulation space Sp1 is a space where the manipulation body distance d (see A of FIG. 7) is smaller than a first threshold distance Dth1 in the area opposing the manipulation surface 70. The first threshold distance Dth1 is set to, for example, about 0.5 to 1 cm. The moving manipulation that moves the finger F along an x-y plane in the first manipulation space Sp1 is defined as a "contact manipulation." That is, the contact manipulation defined here includes (i) a manipulation by the manipulation body of the manipulator in an actual contact state and (ii) a manipulation by the manipulation body in a very close state.

(2) In-Air Manipulation Mode

In the in-air manipulation mode, as shown in C of FIG. 7, the moving manipulation by the finger F is associated with a scroll control of the map 64 displayed on the display screen 52 to move (hereinafter called "scroll") the map 64 in each direction along the display screen 52. In such an in-air manipulation mode, the finger F is located in a second manipulation space Sp2. The second manipulation space Sp2 is a space where the manipulation body distance d is equal to or greater the first threshold distance Dth1 and smaller than a second threshold distance Dth2 in the area opposing the manipulation surface 70. The second threshold distance Dth2 is set to, for example, about 2 to 3 cm. The moving manipulation that moves the finger F along the x-y plane in the second manipulation space Sp2 is defined as an "in-air manipulation."

(3) Non-Adjacent Mode

In the non-adjacent mode, as shown in A of FIG. 7, the moving manipulation by the finger F is not associated with any image portion of the display screen 52. In such a non-adjacent mode, the finger F is located in neither of the first manipulation space Sp1 (see B of FIG. 7) nor second manipulation space Sp2 (see C of FIG. 7). Thus, the space except the first manipulation space Sp1 and second manipulation space Sp2 is a non-adjacent space.

The following will explain details of a tactile pattern 71 and a visual pattern 67 formed for improvement of manipulation in the configuration that distinguishes the movement of the finger F detected in the first manipulation space Sp1 (see B of FIG. 7) from the movement of the finger F detected in the second manipulation space Sp2 (see C of FIG. 7).

Figure 5:
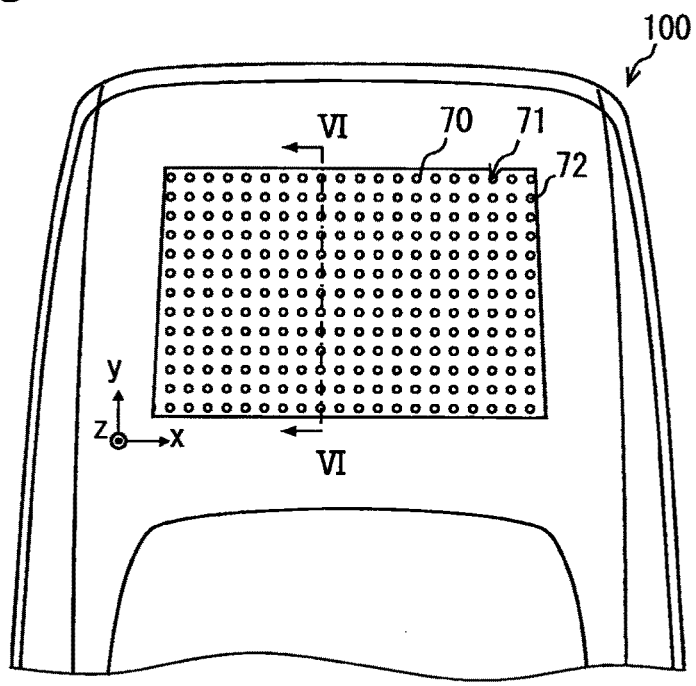
FIG. 5 is a top view schematically illustrating the remote manipulation apparatus of the first embodiment.
Figure 6:
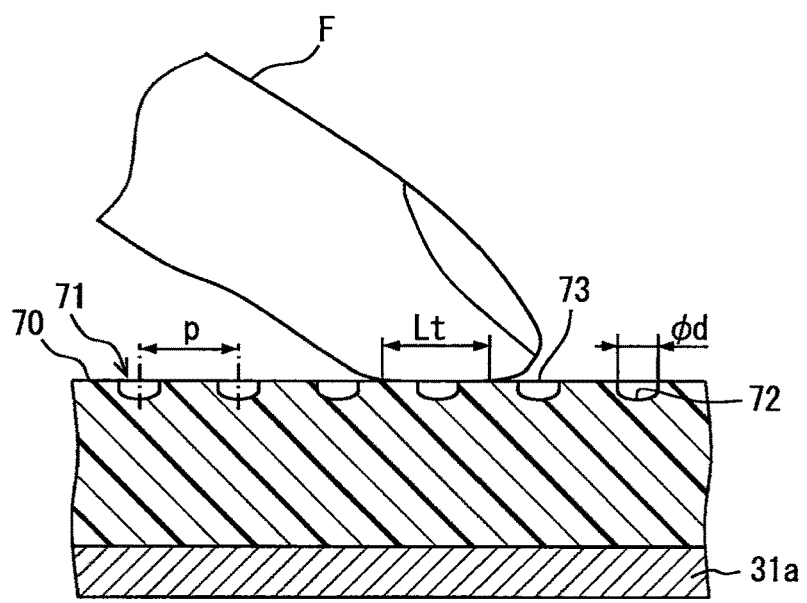
FIG. 6 is a diagram for explaining a configuration of the remote manipulation apparatus of the first embodiment, and is a sectional view of FIG. 5 taken along the line VI-VI.

As shown in FIGS. 5 and 6, the tactile pattern 71 is formed to an outer surface, which is accessible from an outside, of the manipulation surface 70. The tactile pattern 71 is formed of a dot pattern of arranged punctiform dots. Each dot of the tactile pattern 71 is formed of a recessed portion 72 formed by recessing the manipulation surface 70 in a substantially circular shape. A plurality of recessed portions 72 are arranged at predetermined intervals in the x-axis direction, y-axis direction, and the intermediate direction between the x-axis and y-axis directions; those directions are assumed to be main directions of the movement of the finger F. Such an arrangement of the recessed portions 72 permits the tactile pattern 71 to have repeated substantially-uniform recesses in a plurality of directions along the manipulation surface 70.

As shown in FIG. 6, the tactile pattern 71 is further provided such that an inner diameter φd of an opening 73 of the recessed portion 72 is made smaller than a minimum length Lt of the shape of an assumed contact surface between the manipulation surface 70 and finger F. As such, the tactile pattern 71 enables the manipulator touching the manipulation surface 70 with the finger F to easily sense the shape of one circularly-recessed dot through tactility. An interval p between the recessed portions 72 adjacent to each other is defined similar to or slightly smaller than the minimum length Lt of the contact surface. The manipulator who is ready for dragging on the manipulation surface 70 can thus touch certainly any of the dots of the tactile pattern 71.

The visual pattern 67 shown in FIG. 3 is displayed on the display screen 52 to correspond to the tactile pattern 71. The visual pattern 67 has a dot pattern corresponding to the shape of the tactile pattern 71 (see FIG. 5). The visual pattern 67 is similar to the shape of the tactile pattern 71. The visual pattern 67 is displayed in the area of a standby image portion 68 having a circular shape. The standby image portion 68 has a larger area than the pointer 62. The standby image portion 68 is located, for example, in the lower left corner portion of the screen 52 to avoid the center of the display screen 52. When the finger F is separate from the first manipulation space Sp1 (see B of FIG. 7), the pointer 62 is displayed to be superimposed on the standby image portion 68 (see A of FIG. 7). The visual pattern 67 is thereby displayed around the pointer 62.

With reference to FIG. 7, the following will explain sequentially a series of icon selections until the manipulator selects an arbitrary icon 63 while being taught the manipulation method by the patterns 71 and 67 in the above-described display system 10 (see FIG. 1).

Here, A of FIG. 7 shows a state that the manipulator has started an action to make the finger F approach to the manipulation surface 70. The manipulator who is going to start an icon selection moves the finger F, which is located apart from the manipulation surface 70 by a distance greater than the second threshold distance Dth2, toward the manipulation surface 70. In the state of A of FIG. 7 providing the manipulation mode serving as the non-adjacent mode, the remote manipulation apparatus 100 does not associate the manipulation by the finger F with the image portions. On the display screen 52, the pointer 62 is superimposed on the standby image portion 68; the visual pattern 67 is thus displayed around the pointer 62.

Here, B of FIG. 7 shows a state that the finger F has been moved from the non-adjacent space to the first manipulation space Sp1. The manipulator who has touched the manipulation surface 70 can relate the tactile pattern 71 and visual pattern 67 to each other by sensing the tactile pattern 71 through the tactility of the finger F. With such a manipulation teaching method, the manipulator is taught that the pointer 62 superimposed on the visual pattern 67 is targeted for contact manipulation.

Further, the manipulation mode of the remote manipulation apparatus 100 is now switched from the non-adjacent mode to the contact manipulation mode. In this way, when the moving manipulation is associated with the pointer control, the pointer 62 is separated from the standby image portion 68 to move to a location on the display screen 52 that corresponds to a location of the finger F relative to the manipulation surface 70.

Note that the association between the moving manipulation of the finger F and pointer control may be inhibited until a touch (hereinafter called a "tap") is input onto the manipulation surface 70 by the finger F having moved to the first manipulation space Sp1. Further, the standby image portion 68 may be stopped from being displayed on the display image 60 when the pointer 62 is separated therefrom.

Here, C of FIG. 7 shows the state of having moved the finger F from the first manipulation space Sp1 (see B of FIG. 7) to the second manipulation space Sp2. In response to this movement, the manipulation mode of the remote manipulation apparatus 100 is switched from the contact manipulation mode to the in-air manipulation mode. This associates the moving manipulation with the scroll control; the manipulator can scroll the map 64 in the vertical and horizontal directions by moving the finger F. Additionally, the pointer 62 moves into the standby image portion 68 to be superimposed on the image portion 68.

By combining the above contact manipulation and in-air manipulation, the manipulator can superimpose the pointer 62 on the arbitrary icon 63. Then, the manipulator can select the arbitrary icon 63 by inputting a tap onto the manipulation surface 70 under the state superimposing the pointer 62 on the arbitrary icon 63.

Then, the manipulator who has selected the arbitrary icon 63 moves the finger F to the non-adjacent space, as shown in A of FIG. 7. This switches the manipulation mode to the non-adjacent mode and causes the remote manipulation apparatus 100 to enter a state of waiting the subsequent icon selection by the manipulator.

Figure 8:
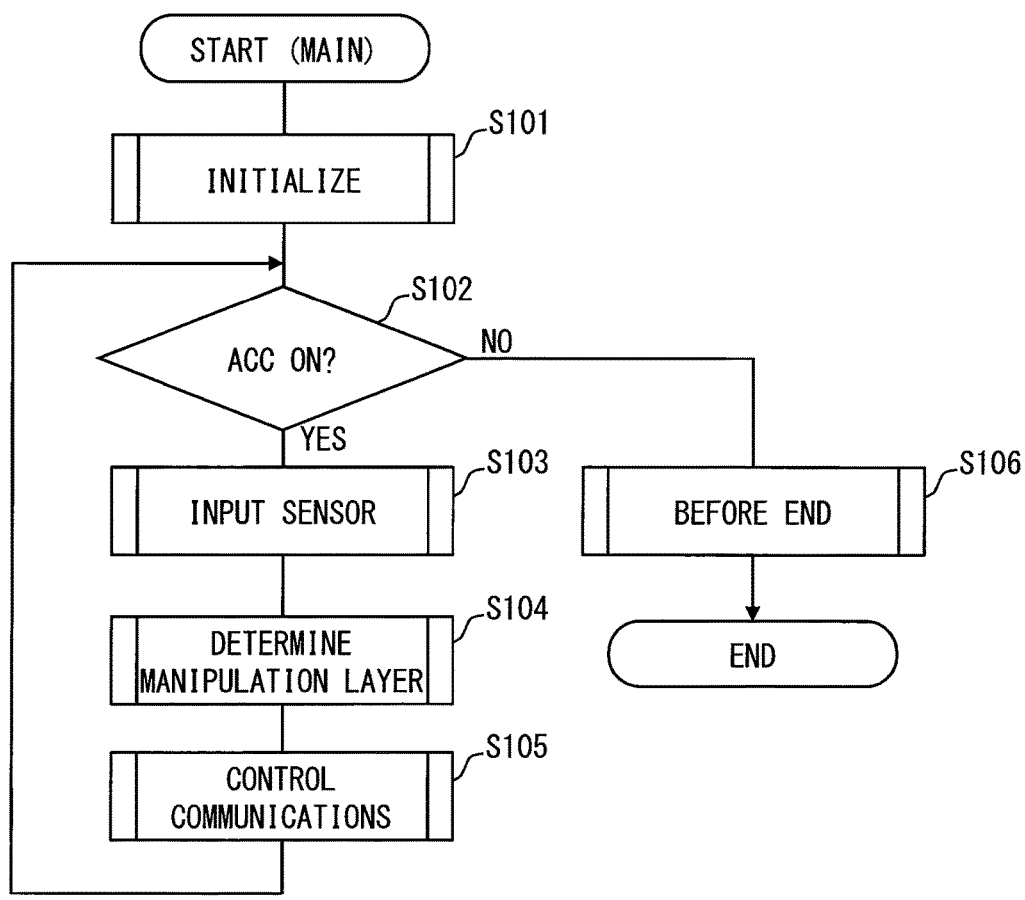
FIG. 8 is a flowchart illustrating main processing performed by a manipulation control circuit in the remote manipulation apparatus of the first embodiment.

Each process performed by the manipulation control circuit 33 to realize the above icon selection (see FIG. 1) is explained in detail based on FIGS. 8 to 12. The main processing shown in FIG. 8 is started by the manipulation control circuit 33 when the ACC power of the vehicle is turned on.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

In S101, initialization of the flash memory is performed; then, the flow proceeds to S102. In S102, it is determined whether the ACC power of the vehicle is in the on state. When it is determined that the ACC power has not been turned on in S102, the flow proceeds to S106, which performs a process before the end so as to stop the output. Then, the main processing is ended.

In contrast, when it is determined that the ACC power has been turned on in S102, the flow proceeds to S103. In S103, the touch sensor input process described in detail later is performed to set the state of the manipulation by the finger F to the manipulation surface 70 to one of the "contact manipulation," "in-air manipulation," and "non-adjacent state" and acquire the set state; then, the flow proceeds to S104. Additionally, in S103, when the manipulation state is in the "contact manipulation" or "air manipulation," the information on the x-coordinate, y coordinate, and z coordinate (hereinafter "input location coordinate") that show the relative location of the finger F to the manipulation surface 70 is acquired.

In S104, the manipulation layer determination described later in detail is performed to set a rendering layer targeted for manipulation (hereinafter called a "selected layer") to one of the layers L1, L2, and L3 and acquire the selected layer; then, the flow proceeds to S105. The selected layer includes the image portion associated with the manipulation by the finger F.

In S105, the visual pattern 67 is displayed, and the communication control is performed to change the display form of the image portion associated with the movement of the finger F. The display form may be a display mode or display manner, and also includes various specifications of colors, shapes, sizes, and contents that are related to the display or its design and specifications of temporal changes of the display specifications. Thus, signals showing the information acquired in S103 and S104 are output to the CAN bus 90; then, the flow returns to S102. The information outputted in S105 includes coordinate information showing the relative location of the finger F and information showing the selected layer. During the on-state of the ACC power, the processes in S102 to S105 are repeated.

Figure 9:
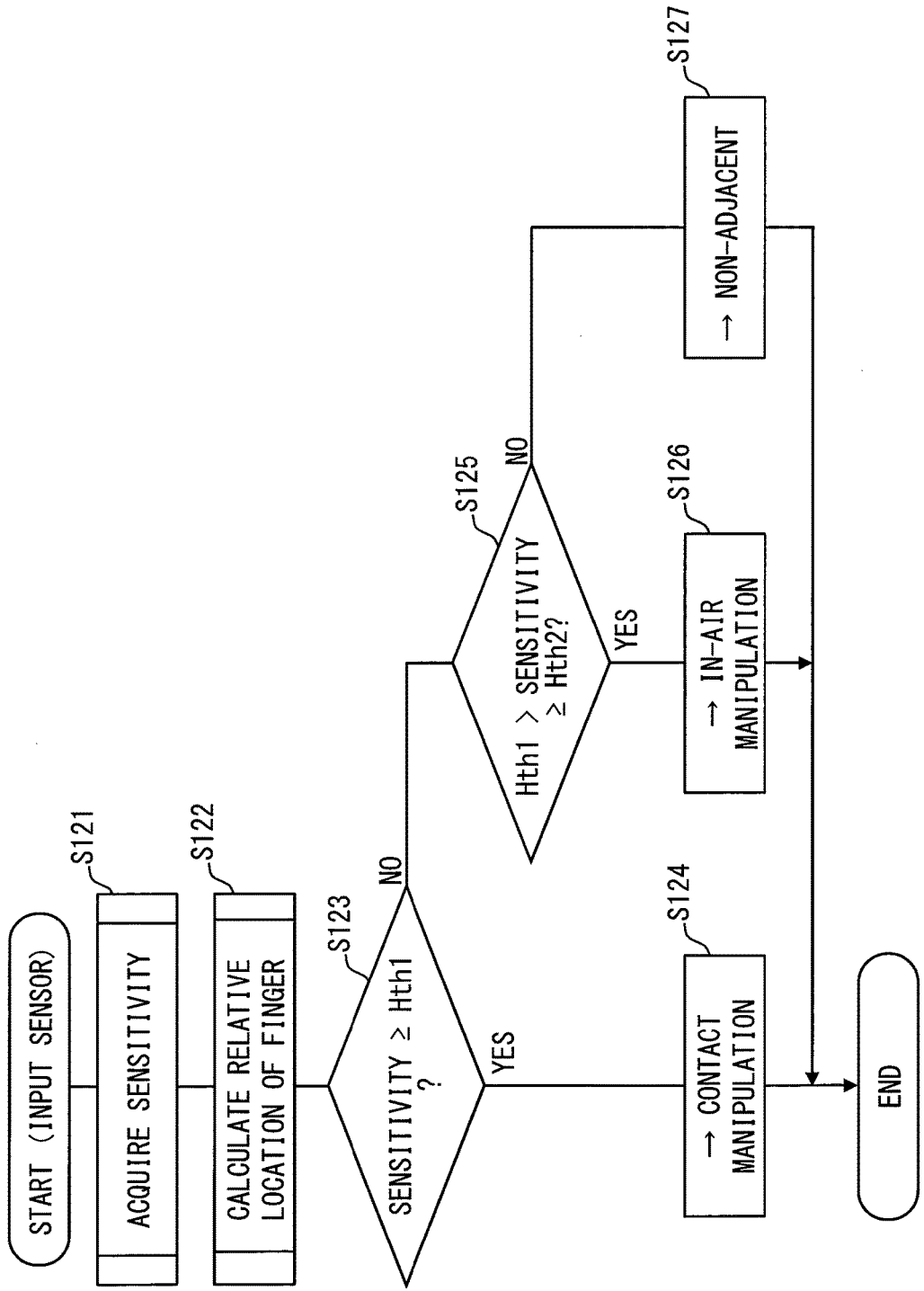
FIG. 9 is a flowchart illustrating a touch sensor input performed by the manipulation control circuit of the first embodiment.

Next, the touch sensor input process performed in S103 is explained in detail based on FIGS. 9 to 11.

In S121, the acquisition process is performed to acquire the sensitivity value detected in each electrode of the touch sensor 31a; then, the flow proceeds to S122. In S122, an input location coordinate is calculated on the basis of the sensitivity value acquired in S121; then, the flow proceeds to S123.

Here, as shown in the listing diagram shown in FIG. 11, a sensibility threshold Hth1 corresponding to the first threshold distance Dth1 and a sensibility threshold Hth2 corresponding to the second threshold distance Dth2 are stored in advance in the manipulation control circuit 33 (see FIG. 1). In the processing after S123 in FIG. 9, the manipulation control circuit 33 compares a maximum sensitivity value acquired in S122 to each of the sensibility thresholds Hth1 and Hth2.

In S123, it is determined whether the finger F is in the first manipulation space Sp1 on the basis of whether the sensitivity value is equal to or greater than the first sensibility threshold Hth1. When a positive determination is made in S123, the flow proceeds to S124. In S124, the manipulation state is set to the "contact manipulation"; then, the touch sensor input processing is ended.

In S125 after a negative determination has been made in S123, it is determined whether the finger F is in the second manipulation space Sp2 on the basis of whether the sensitivity value is equal to or greater than the sensibility threshold Hth2 and smaller than the first sensibility threshold Hth1. When a positive determination is made in S125, the flow proceeds to S126. In S126, the manipulation state is set to the "in-air manipulation," and the touch sensor input processing is ended. In contrast, in S127 after a negative determination has been made in S125, the manipulation state is set to the "non-adjacent state"; then, the touch sensor input processing is ended.

Next, the manipulation layer determination performed in S104 (see FIG. 8) is explained in detail based on FIG. 12.

In S131, the latest manipulation state set by the touch sensor input processing (see FIG. 9) is acquired; then, the flow proceeds to S132. In S132, it is determined whether the manipulation state acquired in S131 is in the "contact manipulation." When a positive determination is made in S132, the flow proceeds to S133, in which the pointer layer L1 is set as the selected layer to perform the manipulation corresponding to the contact manipulation mode in the navigation apparatus 50. Then, the manipulation layer determination is ended.

In S134 after a positive determination has been made in S132, it is determined whether the manipulation state acquired in S131 is in the "in-air manipulation." When a positive determination is made in S134, the flow proceeds to S135. In S135, the map layer L2 is set as the selected layer to perform the manipulation corresponding to the in-air manipulation in the navigation apparatus 50. Then, the manipulation layer determination is ended. In contrast, when a negative determination is made in S134, the flow proceeds to S136, in which the selected layer is set as "none." Then, the manipulation layer determination is ended.

Through the above processing, the display control circuit 53 in FIG. 1 acquires each signal outputted from the manipulation control circuit 33 via the CAN bus 90 in repeated S105. The display control circuit 53 displays the standby image portion 68 forming the visual pattern 67 as shown in FIG. 7 on the display screen 52, and determines the image portion targeted for manipulation on the basis of a layer specifying signal showing the selected layer. The display control circuit 53 (see FIG. 1) controls the image portion targeted for manipulation in response to a coordinate signal showing the relative location of the finger F. Thus, the display forms of the pointer 62 and map 64 change with the movement of the finger F.

According to the above first embodiment, the manipulator who particularly performs the contact manipulation using the finger F while making the finger F contact the manipulation surface 70 can sense the dot pattern formed by the tactile pattern 71, through tactility. Additionally, the manipulator can sense the dot pattern formed by the visual pattern 67 displayed around the pointer 62 through sight. With teaching of such combination of tactility and sight, the manipulator can relate the tactile pattern 71 and visual pattern 67 to each other whose shapes correspond to each other. The manipulator can thus easily identify the pointer 62 targeted for the contact manipulation from a plurality of image portions displayed on the display screen 52.

Additionally, since the tactile pattern 71 and visual pattern 67 are similar to each other in shape, the manipulator can relate the patterns 71 and 67 to each other more easily in the first embodiment. This achieves the advantageous effect of making the pointer 62 easily identifiable with higher certainty.

According to the first embodiment, the manipulator can sense the visual pattern 67 in the standby image portion 68 even while the finger F is separate from the first manipulation space Sp1 (see A and C of FIG. 7). Therefore, before making the finger F reach the first manipulation space Sp1, the manipulator may be taught the pointer 62 targeted for the contact manipulation by the display image 60. Therefore, before a start of the contact manipulation, the manipulator can identify the pointer 62 with sufficient margin.

Furthermore, the tactile pattern 71 of the first embodiment includes repeated recesses in each direction along the manipulation surface 70. This may avoid the feeling of manipulation on dragging the manipulation surface 70 from changing with the moving direction of the finger F. Additionally, since the tactile pattern 71 is formed of the recessed portions 72, the movement of the finger F on dragging the manipulation surface is less likely to be interfered by the tactile pattern 71. Even when the tactile pattern 71 is formed on the manipulation surface 70, feeling of the manipulation performed with the finger F contacting with the manipulation surface 70 can be maintained at a high level.

Additionally, since the inner diameter φd of the opening 73 is made smaller than the minimum length Lt of the contact surface for the finger F, the manipulator senses the shape of the tactile pattern 71 more easily. The manipulator can thus identify the pointer 62 more quickly.

Further, the above pointer 62 has a small area occupying the display screen 52; this makes it difficult for the manipulator to find the visual pattern 67 even when the visual pattern 67 is displayed in the pointer 62. According to the first embodiment, after the visual pattern 67 is displayed on the area in the standby image portion 68, the pointer 62 is displayed to be superimposed on the standby image portion 68. Such a display form permits the visual pattern 67 to be arranged around the pointer 62; the pointer 62 targeted for the contact manipulation is more teachable. The manipulator can thus identify the pointer 62 more quickly.

In the first embodiment, the detection circuit 31 and manipulation control circuit 33 are capable of functioning as a detection section and an acquisition section in association with each other. The manipulation control circuit 33 is capable of functioning as an association section and a display control section. The pointer 62 may be also referred to as a first image portion and a pointer portion. The map 64 may be also referred to as a second image portion. The first threshold distance Dth1 may be also referred to as a threshold distance. The inner diameter φd of the opening 73 may be also referred to as a maximum inner dimension. The finger F of the manipulator may be also referred to as a manipulation body. S121 and S122 of the touch sensor input processing may be also referred to as a detection step and an acquisition step. S123 to S126 of the touch sensor input processing and S132 to S135 of the manipulation layer determination may be also referred to as an association step. S105 of the main processing may be referred to as a display control step. The remote manipulation apparatus 100 may be referred to as just a manipulation apparatus.

Second Embodiment

Figure 13:
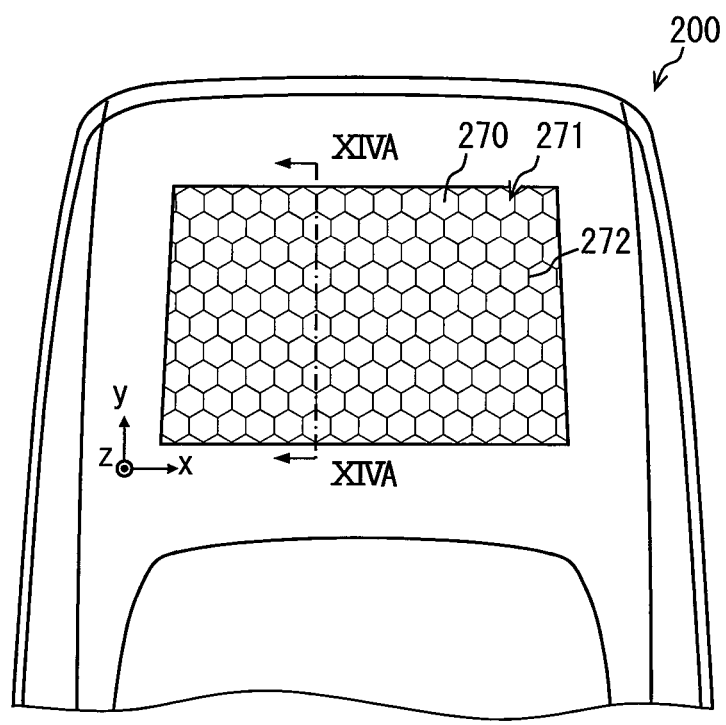
FIG. 13 is a plan view schematically illustrating a remote manipulation apparatus of a second embodiment.
Figure 14:
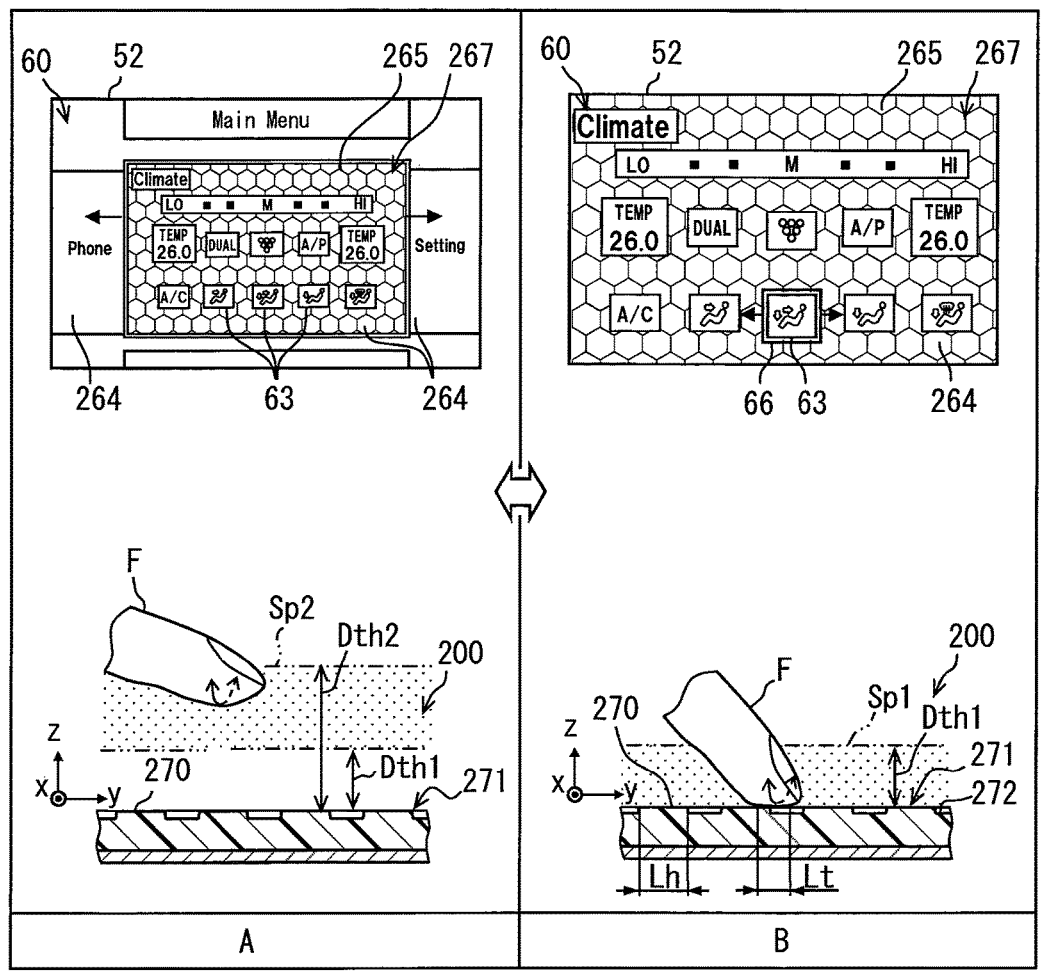
FIG. 14 a diagram for explaining image portions targeted for manipulation changing depending on the manipulation body distance in the remote manipulation apparatus of the second embodiment.

A second embodiment of the present disclosure shown in FIGS. 13 and 14 is a modification of the first embodiment. In a remote manipulation apparatus 200 of the second embodiment, a tactile pattern 271 and a visual pattern 267 are different in shape from the pattern 71 and pattern 67 (see A of FIG. 7) of the first embodiment, respectively. Hereafter, each pattern 271,267 of the second embodiment is explained in detail using the example displaying submenu images 264 as the display images 60.

First, a series of icon selections will be explained which is performed by the manipulator to select the submenu images 264 and icons 63 sequentially.

Here, A of FIG. 14 shows a state of having moved the finger F to the second manipulation space Sp2. At this time, the manipulation mode of the remote manipulation apparatus 200 is switched to the in-air manipulation mode. Thereby, the display screen 52 is switched to the state that permits a plurality of submenu images 264 to be scrolled in the vertical and horizontal directions. The moving manipulation by the finger F is associated with the scroll control that scrolls the plurality of submenu images 264 as the in-air manipulation.

Here, B of FIG. 14 shows the state of having moved the finger F to a manipulation surface 270 in the first manipulation space Sp1. At this time, the manipulation mode of the remote manipulation apparatus 200 is switched to the contact manipulation mode. Thereby, the submenu image 264 displayed in the center of the display screen 52 is expanded to and displayed on the entirety of the display screen 52. As the contact manipulation, the movement of the finger F is associated with the icon control that changes the icon 63 on which the focus 66 is superimposed.

Combining the above in-air manipulation and contact manipulation enables the manipulator (i) first to select from the submenu images 264 including the arbitrary icon 63, and (ii) second to superimpose the focus 66 on the icon 63 in the image 264. Under such a state, the manipulator can select the arbitrary icon 63 by inputting a tap onto the manipulation surface 270.

The following will explain the tactile pattern 271 and visual pattern 267 of the second embodiment in detail.

As shown in FIG. 13 and B of FIG. 14, the tactile pattern 271 formed to the manipulation surface 270 is shaped of arranged right hexagons. Thus, each of the right hexagons tessellated on the manipulation surface 270 is defined by grooves 272 formed by recessing the manipulation surface 270. The respective right hexagons are repeatedly arranged in the x-axis direction assumed to be a main direction of the finger F and in two directions that each intersect the x-axis direction at an angle of 60 degrees. A length Lh of a diagonal line of one right hexagon is made smaller than the minimum length Lt of the assumed contact surface between the finger F and manipulation surface 270. The manipulator can easily sense the shape of each right hexagon because of such a form of the tactile pattern 271.

In contrast, the visual pattern 267 is similar in shape to the tactile pattern 271, and designed to have tessellated right hexagons similarly to the tactile pattern 271. In the in-air manipulation mode as shown in A of FIG. 14, the visual pattern 267 is displayed as a background 265 of the submenu image 264 located in the center of the display screen 52. As shown in B of FIG. 14, when a switchover to the contact manipulation mode is made, the visual pattern 267 continues to be displayed as the background 265 of the submenu image 264 expanded to the entirety of the display screen 52. The plurality of icons 63 are thus superimposed on the background 265; the visual pattern 267 is displayed around each icon 63.

The above patterns 271, 267 also provide an advantageous effect similar to that of the patterns 71, 67 of the first embodiment (see A of FIG. 7), and enable the combination of tactility and sight to teach the manipulator. The manipulator can thus easily identify the icon 63 targeted for manipulation in the contact manipulation mode from the plurality of image portions displayed on the display screen 52.

Additionally, according to the second embodiment, the visual pattern 267 is displayed as the background 265 of the icons 63; this can easily expand the display area of the visual pattern 267 in the in-air manipulation mode. Thus, the shape of the visual pattern 267 is more easily sensed in the in-air manipulation mode; the manipulator can easily identify the icon 63 targeted for manipulation in advance before a switchover to the contact manipulation mode.

In the second embodiment, the icon 63 may be also referred to as a first image portion or a selected image portion. The submenu image 264 may be also referred to as a second image portion. The background 265 may be also referred to as a background image portion. The remote manipulation apparatus 200 may be also referred to as just a manipulation apparatus.

Another Embodiment

While the above explains the embodiments of the present disclosure, the present disclosure is not limited thereto, but is applicable to various embodiments and the combinations thereof without departing from the contents of the present disclosure.

Figure 15:
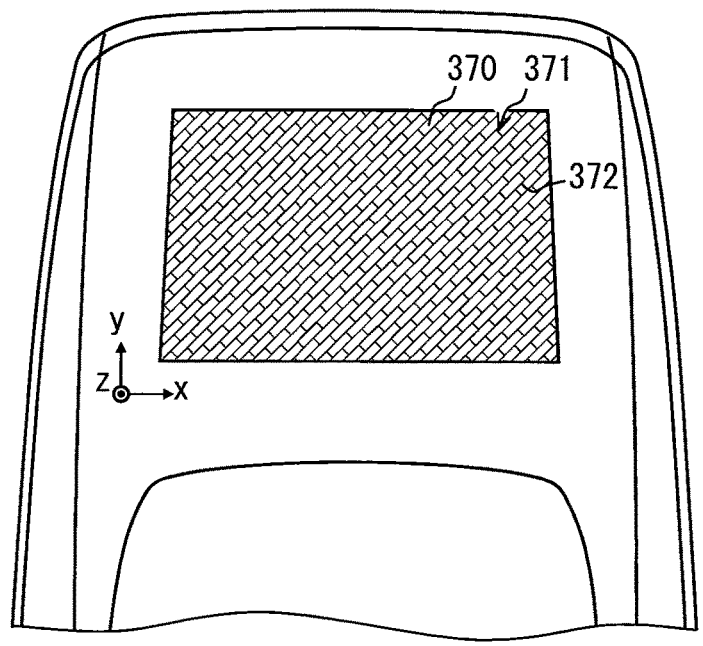
FIG. 15 is a diagram illustrating an example of a modification of FIG. 5.
Figure 16:
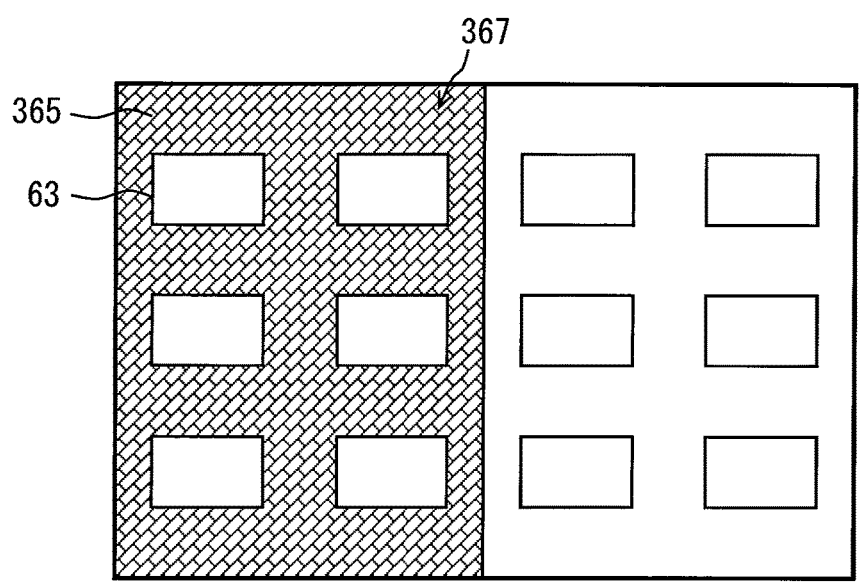
FIG. 16 is a diagram illustrating a modification of FIG. 3.
Figure 17:
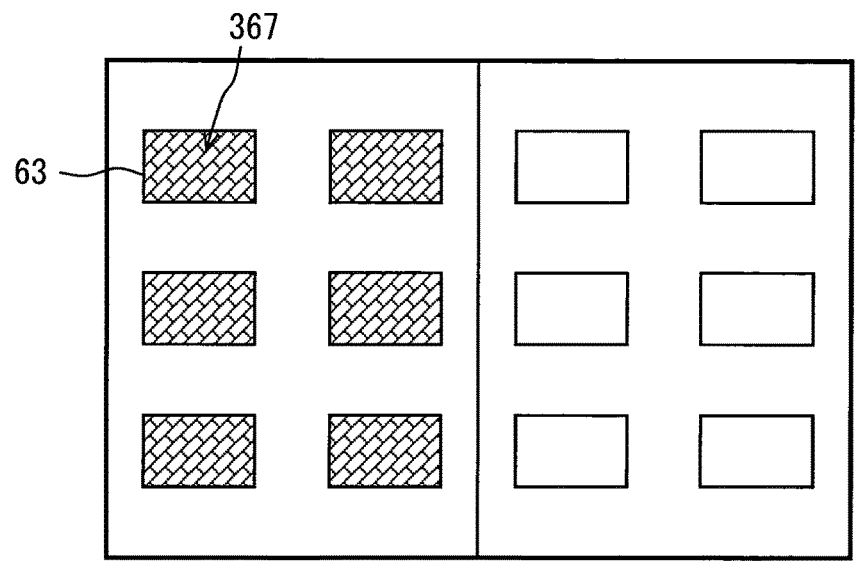
FIG. 17 is a diagram illustrating a modification of FIG. 16.

With reference to FIGS. 15 to 17, a modification 1 of the above embodiments forms a tactile pattern 371 arranging rectangles on a manipulation surface 370; the rectangles have longitudinal directions that are inclined relative to the x-axis and y-axis are arranged. In this tactile pattern 371, the intervals of grooves 372 that define each rectangle are different between the x-axis and y-axis directions assumed to be the moving directions of the finger F (see FIG. 6). As in the modification 1, the recesses and projections that form the tactile pattern may use an anisotropic form in which the repeated intervals and steps vary in size in dependence on the moving directions of the finger F. In contrast, as in the above embodiments 1 and 2, the recesses and projections that form the tactile pattern may use an isotropic form in which the repeated intervals and steps are uniformly sized in the moving directions of the finger F.

In the modification 1, the display area including the icon 63 targeted for manipulation is changed when the manipulation mode is changed between the in-air manipulation mode and contact manipulation mode. In such a form, a visual pattern 367 corresponding to the tactile pattern 371 may be displayed as a background 365 of the display area including the icon 63 targeted for manipulation, as shown in FIG. 16. Alternatively, as shown in FIG. 17, the visual pattern 367 may be displayed on the icon 63 targeted for manipulation. Further, as long as the identities of the icons are securable, the visual pattern may be displayed both on the icons and around the icons.

In the modification 1, the aspect ratio of each rectangle that forms the tactile pattern 371 differs from the aspect ratio of each rectangle that forms the visual pattern 367. Thus, as long as the shapes of the tactile pattern and visual pattern sensed by the manipulator are sensibly conformable to each other in pattern and design, the tactile pattern and visual pattern may not have exactly similar shapes to each other. Their horizontal to vertical ratios (i.e., aspect ratios) and repeated intervals may be properly changed.

When the tactile pattern and visual pattern are similar to each other in shape, the tactile pattern may be formed larger than the visual pattern or the visual pattern may be larger than the tactile pattern. To avoid confusion with the design of the icons, one design forming the visual pattern is, desirably, not similar to at least the design of the icons.

Figure 18:
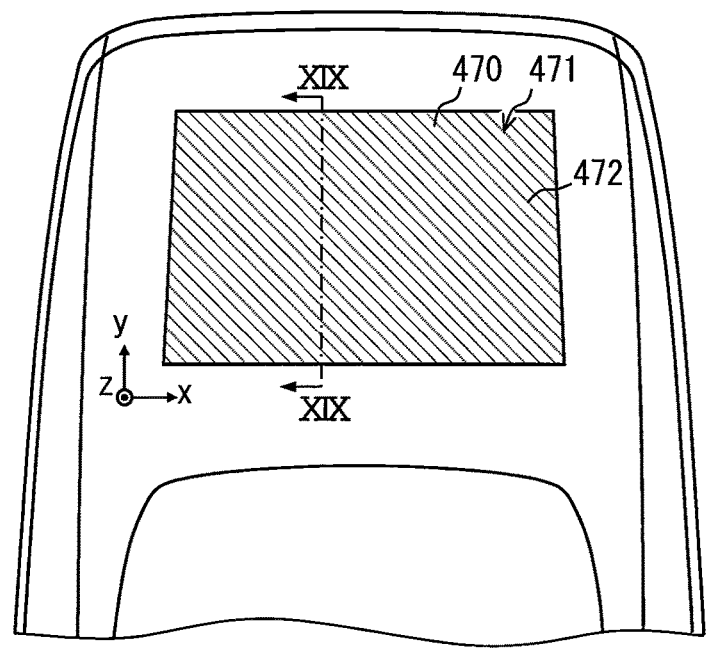
FIG. 18 is a diagram illustrating another modification of FIG. 5.
Figure 19:
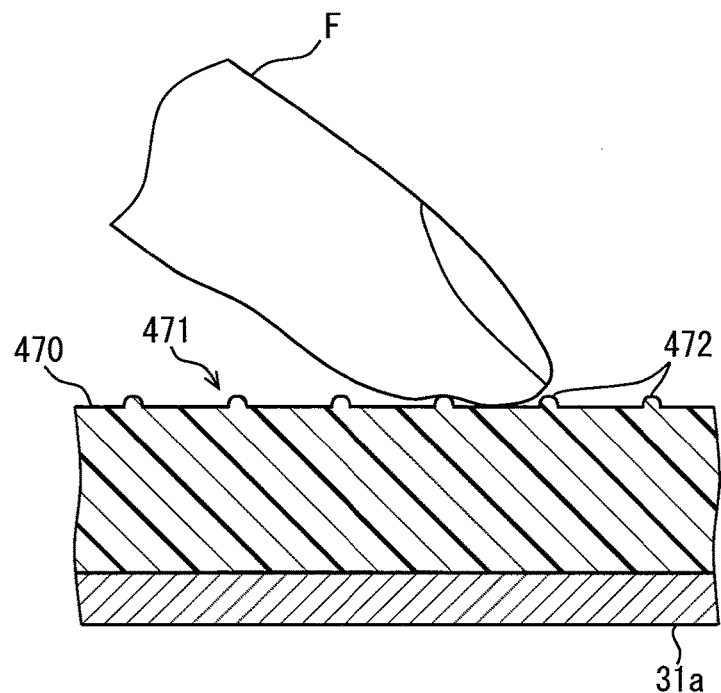
FIG. 19 is a sectional view of FIG. 18 taken along the line XIX-XIX.
Figure 20:
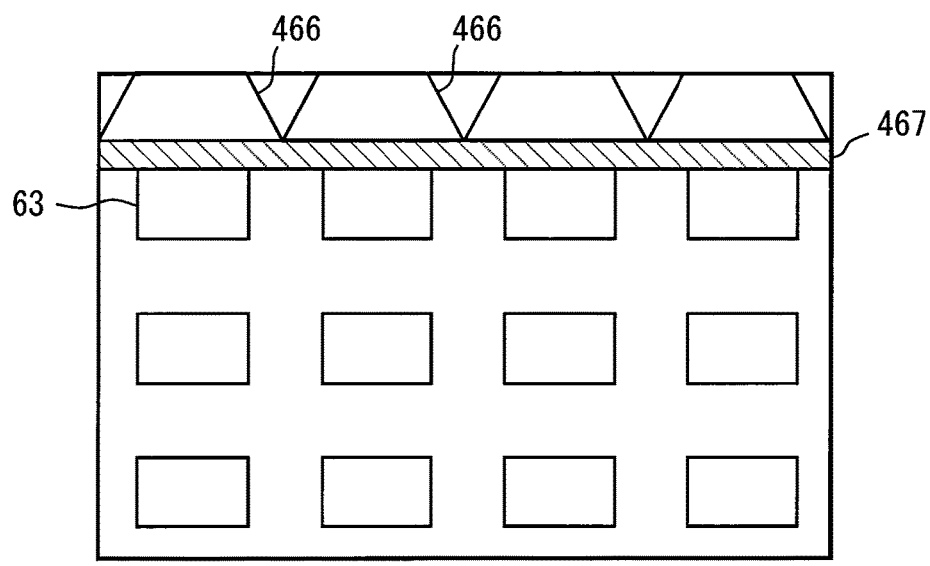
FIG. 20 is a diagram illustrating another modification of FIG. 3.

With reference to FIGS. 18 to 20, a modification 2 of the above embodiments forms a tactile pattern 471 arranging projected portions 472 extending obliquely to the x-axis and y-axis on a manipulation surface 470. In this tactile pattern 471, the heights of the projected portions 472 are desirably maintained to be sensible by the finger F while being restrained from obstructing the movement of the finger F. Restraining the heights of the projected portions 472 helps prevent an air layer from being produced between the manipulation surface 470 and finger F; this can also restrain a reduction in sensibility of the touch sensor 31*a* due to the air layer.

In the in-air manipulation mode in the modification 2, as shown in FIG. 20, tabs 466 are selectable. In contrast, in the contact manipulation mode in the modification 2, the icons 63 contained in the selected tabs 466 are selectable. In such a form, a visual pattern 467 corresponding to the tactile pattern 471 (see FIG. 18) is displayed, as a design extending horizontally in a belt shape, on the display area where the icons 63 are arranged.

Figure 21:
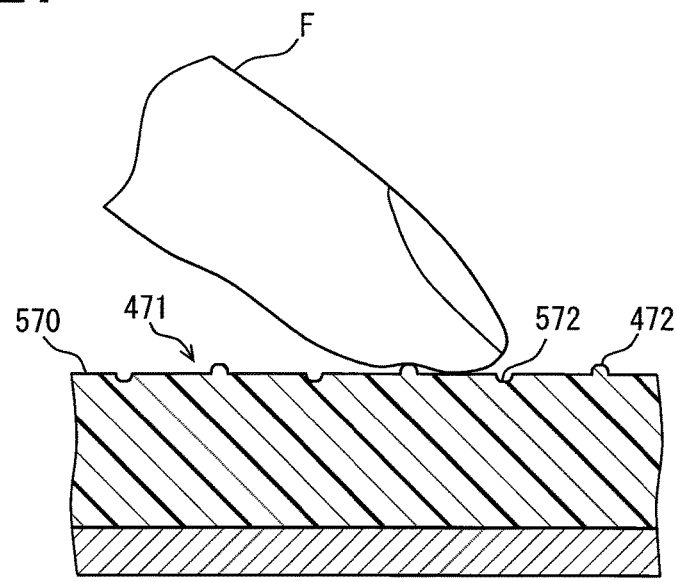
FIG. 21 is a diagram illustrating a modification of FIG. 19.

Another form of the modification 2, for example as shown in FIG. 21, forms a tactile pattern 471 of a manipulation surface 570 by alternately forming projected portions 472 and grooves 572 in the aligned extending direction.

In a modification of the above embodiments, the visual pattern is displayed on the display screen when the finger F has moved from the non-adjacent space to the second manipulation space Sp2. Thus, in the non-adjacent mode, the visual pattern may not be displayed. In another modification, after a switchover to the contact manipulation mode, the visual pattern is removed from the display screen to make the icons visible. In another modification, the image portion targeted for manipulation is more easily taught by combining the display of the visual pattern with the control that raises the lightness and brightness of the icons and pointer.

In a modification of the above embodiment, a pressure-sensitive touch sensor is used as the detection section or device; the pressure-sensitive touch sensor detects manipulation by the finger F by detecting pressure applied to the finger F. In contrast, an infrared sensor is used as the acquisition section or device; the infrared sensor measures the manipulation body distance d by the infrared light. In another modification, a camera and an image analysis circuit are used as the acquisition section or device; the camera captures neighborhood of each manipulation surface while the image analysis circuit analyzes images captured by the camera to acquire the manipulation body distance d.

In a modification of the above embodiment, a display using a plasma display panel or a display using organic electroluminescence form the display screen. In another modification, a projection apparatus such as a projector projects images onto a display screen including a windshield or a combiner that is provided to the top surface of the instrument panel. A display apparatus having such a projection apparatus may be included in a navigation apparatus as a component forming the display screen.

Figure 22:
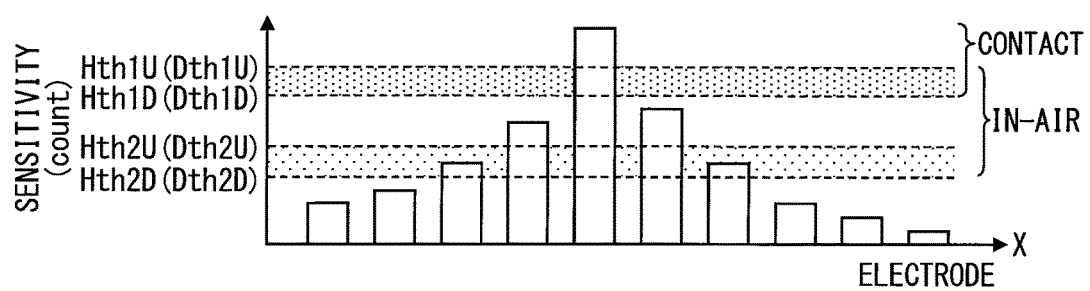
FIG. 22 is a diagram illustrating a modification of FIG. 10.

In a modification of the above embodiment, as shown in FIG. 22, hystereses are provided to the first threshold distance Dth1 and the second threshold distance Dth2. Specifically, based on the fact that the finger F has been located in the first manipulation space Sp1, the first threshold distance is extended from an upper-limit first threshold distance Dth1U corresponding to Dth1 of the above embodiment to a lower-limit first threshold distance Dth1D longer than the upper-limit first threshold distance. Such control becomes possible by changing the first sensibility threshold from an upper-limit first sensibility threshold Hth1U corresponding to Hth1 of the above embodiment to a lower-limit first sensibility threshold Hth1D (for example, about 180) lower than the upper-limit first sensibility threshold. Similarly, based on the fact that the finger F has been located in the second manipulation space Sp2, the second threshold distance is extended from an upper-limit second threshold distance Dth2U corresponding to Dth2 of the above embodiment to a lower-limit second threshold distance Dth2D longer than the upper-limit second threshold distance. Such control becomes possible by changing the second sensibility threshold from an upper-limit second sensibility threshold Hth2U corresponding to Hth2 of the above embodiment to a lower-limit second sensibility threshold Hth2D (for example, 80) lower than the upper-limit second sensibility threshold. This facilitates the manipulation by the finger F in each space Sp1, Sp2.

In the above embodiments, the plurality of functions provided by the manipulation control circuit 33 executing programs may be provided by a hardware different from the above control apparatus or a software, or the combination of the hardware and the software. For example, the functions of the association section and display control section may be provided by an analog circuit that achieves predetermined functions without programs.

The above embodiments are explained using the examples applying the present disclosure to the remote manipulation apparatus used for the display system mounted to the vehicle. However, the present disclosure is applicable also to the so-called touch panel manipulation apparatus integrated with a display screen. A manipulation apparatus applying the present disclosure is employable generally in display systems used in various transportation apparatuses and various information terminals.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A manipulation apparatus to manipulate an image portion displayed on a display screen according to an input by a manipulation body to a manipulation surface,
   the manipulation apparatus comprising:
   a detection circuit, and
   a manipulation control circuit,
   the manipulation control circuit and the detection circuit being configured to
   detect a movement of the manipulation body, and
   acquire a manipulation body distance that is from the manipulation surface to the manipulation body;
   the manipulation control circuit being further configured to
   distinguish between (i) a first movement of the manipulation body detected in a first manipulation space providing the manipulation body distance being smaller than a predetermined threshold distance and (ii) a second movement of the manipulation body detected in a second manipulation space providing the manipulation body distance being equal to or greater than the threshold distance,
   associate the first movement in the first manipulation space and the second movement in the second manipulation space, respectively, with a first image portion and a second image portion that are displayed on the display screen, the second image portion being different from the first image portion, and
   change, in response to the movement of the manipulation body, a display form of either the first image portion associated with the first movement or the second image portion associated with the second movement,
   wherein:
   the manipulation surface is provided to form a tactile pattern with at least one of recesses and projections;
   the manipulation control circuit displays a visual pattern corresponding to a shape of the tactile pattern, at least, on or around the first image portion on the display screen; and
   upon the manipulation body being separated from the first manipulation space, the manipulation control circuit displays the visual pattern on the display screen.

2. The manipulation apparatus according to claim 1, wherein
   the tactile pattern provides repeated substantially-uniform shapes that are either recessed or projected, in a plurality of directions along the manipulation surface.

3. The manipulation apparatus according to claim 1, wherein:
   the tactile pattern is formed of recessed portions provided to the manipulation surface.

4. The manipulation apparatus according to claim 3, wherein
   each of the recessed portions includes an opening having a maximum inner dimension that is smaller than a predetermined length.

5. The manipulation apparatus according to claim 1, wherein
   the manipulation control circuit
   displays
   a pointer portion as the first image portion, the pointer portion showing a location on the display screen that corresponds to a location of the manipulation body on the manipulation surface, and
   a standby image portion formed of the visual pattern being arranged off a center of the display screen, the standby image portion having an area that is larger than the pointer portion, and
   superimposes the pointer portion on the standby image portion when the manipulation body is separated from the first manipulation space.

6. The manipulation apparatus according to claim 1, wherein
the manipulation control circuit displays, on the display screen,
a selected image portion as the first image portion selected by manipulation in the first manipulation space, and
a background image portion formed of the visual pattern, the background image portion providing a background of the selected image portion.

7. The manipulation apparatus according to claim 1, wherein
the visual pattern has a shape similar to a shape of the tactile pattern.

8. A manipulation teaching method for teaching a manipulation to a manipulation apparatus that manipulates an image portion displayed on a display screen according to an input by a manipulation body to a manipulation surface,
the manipulation teaching method comprising:
a detecting step that detects a movement of the manipulation body;
an acquiring step that acquires a manipulation body distance that is from the manipulation surface to the manipulation body;
an associating step that
distinguishes between (i) a first movement of the manipulation body detected in a first manipulation space providing the manipulation body distance being smaller than a predetermined threshold distance and (ii) a second movement of the manipulation body detected in a second manipulation space providing the manipulation body distance being equal to or greater than the threshold distance, and
relates the first movement in the first manipulation space and the second movement in the second manipulation space, respectively, with a first image portion and a second image portion that are displayed on the display screen, the second image portion being different from the first image portion;
a display controlling step that changes a display form of either the first image portion or the second image portion in response to the movement of the manipulation body,
wherein
in the display controlling step, a visual pattern is displayed, at least, on or around the first image portion on the display screen, the visual pattern corresponding to a shape of a tactile pattern that is formed on the manipulation surface with at least one of recesses and projections; and
upon the manipulation body being separated from the first manipulation space, the visual pattern is displayed on the display screen.

9. A manipulation apparatus to manipulate an image portion displayed on a display screen according to an input by a manipulation body to a manipulation surface,
the manipulation apparatus comprising:
a detection circuit, and
a manipulation control circuit,
the manipulation control circuit and the detection circuit being configured to
detect a movement of the manipulation body, and
acquire a manipulation body distance that is from the manipulation surface to the manipulation body;
the manipulation control circuit being further configured to
distinguish between (i) a first movement of the manipulation body detected in a first manipulation space providing the manipulation body distance being smaller than a predetermined threshold distance and (ii) a second movement of the manipulation body detected in a second manipulation space providing the manipulation body distance being equal to or greater than the threshold distance,
associate the first movement in the first manipulation space and the second movement in the second manipulation space, respectively, with a first image portion and a second image portion that are displayed on the display screen, the second image portion being different from the first image portion, and
change, in response to the movement of the manipulation body, a display form of either the first image portion associated with the first movement or the second image portion associated with the second movement,
wherein:
the manipulation surface is provided to form a tactile pattern with at least one of recesses and projections;
the manipulation control circuit displays a visual pattern corresponding to a shape of the tactile pattern, at least, on or around the first image portion on the display screen; and
the manipulation control circuit
displays
a pointer portion as the first image portion, the pointer portion showing a location on the display screen that corresponds to a location of the manipulation body on the manipulation surface, and
a standby image portion formed of the visual pattern being arranged off a center of the display screen, the standby image portion having an area that is larger than the pointer portion, and
superimposes the pointer portion on the standby image portion when the manipulation body is separated from the first manipulation space.

10. The manipulation apparatus according to claim 9, wherein the tactile pattern provides repeated substantially-uniform shapes that are either recessed or projected, in a plurality of directions along the manipulation surface.

11. The manipulation apparatus according to claim 9, wherein the tactile pattern is formed of recessed portions provided to the manipulation surface.

12. The manipulation apparatus according to claim 11, wherein each of the recessed portions includes an opening having a maximum inner dimension that is smaller than a predetermined length.

13. The manipulation apparatus according to claim 9, wherein the visual pattern has a shape similar to a shape of the tactile pattern.

14. A manipulation apparatus to manipulate an image portion displayed on a display screen according to an input by a manipulation body to a manipulation surface,
the manipulation apparatus comprising:
a detection circuit, and
a manipulation control circuit,
the manipulation control circuit and the detection circuit being configured to
detect a movement of the manipulation body, and
acquire a manipulation body distance that is from the manipulation surface to the manipulation body, the manipulation control circuit being further configured to
  distinguish between (i) a first movement of the manipulation body detected in a first manipulation space providing the manipulation body distance being smaller than a predetermined threshold distance and (ii) a second movement of the manipulation body detected in a second manipulation space providing the manipulation body distance being equal to or greater than the threshold distance,
  associate the first movement in the first manipulation space and the second movement in the second manipulation space, respectively, with a first image portion and a second image portion that are displayed on the display screen, the second image portion being different from the first image portion, and
  change, in response to the movement of the manipulation body, a display form of either the first image portion associated with the first movement or the second image portion associated with the second movement,
wherein:
the manipulation surface is provided to form a tactile pattern with at least one of recesses and projections;
  the manipulation control circuit displays a visual pattern corresponding to a shape of the tactile pattern, at least, on or around the first image portion on the display screen; and
  the manipulation control circuit displays, on the display screen,
    a selected image portion as the first image portion selected by manipulation in the first manipulation space, and
    a background image portion formed of the visual pattern, the background image portion providing a background of the selected image portion.

15. The manipulation apparatus according to claim 14, wherein the tactile pattern provides repeated substantially-uniform shapes that are either recessed or projected, in a plurality of directions along the manipulation surface.

16. The manipulation apparatus according to claim 14, wherein the tactile pattern is formed of recessed portions provided to the manipulation surface.

17. The manipulation apparatus according to claim 16, wherein each of the recessed portions includes an opening having a maximum inner dimension that is smaller than a predetermined length.

18. The manipulation apparatus according to claim 14, wherein the visual pattern has a shape similar to a shape of the tactile pattern.

* * * * *